United States Patent
Tillotson

(10) Patent No.: US 9,068,884 B1
(45) Date of Patent: Jun. 30, 2015

(54) TURBULENCE AND WINDS ALOFT DETECTION SYSTEM AND METHOD

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 524 days.

(21) Appl. No.: 13/685,074

(22) Filed: Nov. 26, 2012

Related U.S. Application Data

(63) Continuation-in-part of application No. 12/579,155, filed on Oct. 14, 2009, now Pat. No. 8,320,630.

(51) Int. Cl.
*G06K 9/00* (2006.01)
*G01J 1/38* (2006.01)

(52) U.S. Cl.
CPC .............. *G01J 1/38* (2013.01); *H04N 2201/327* (2013.01)

(58) Field of Classification Search
None
See application file for complete search history.

(56) References Cited

U.S. PATENT DOCUMENTS

| | | | | |
|---|---|---|---|---|
| 5,146,073 | A * | 9/1992 | Wirth et al. | 250/201.9 |
| 6,388,608 | B1 * | 5/2002 | Woodell et al. | 342/26 R |
| 6,424,408 | B1 * | 7/2002 | Ooga | 356/28.5 |
| 6,903,752 | B2 | 6/2005 | Ebersole et al. | |
| 7,139,067 | B2 * | 11/2006 | Pohle et al. | 356/5.04 |
| 7,343,793 | B2 | 3/2008 | Tillotson et al. | |
| 7,530,266 | B2 | 5/2009 | Tillotson et al. | |
| 7,880,666 | B2 * | 2/2011 | Tillotson et al. | 342/26 B |
| 7,889,328 | B2 | 2/2011 | Tillotson | |
| 8,174,431 | B2 | 5/2012 | Tillotson et al. | |
| 8,339,583 | B2 | 12/2012 | Tillotson | |
| 8,345,115 | B2 | 1/2013 | Tillotson | |
| 2002/0079425 | A1 * | 6/2002 | Rhoads | 250/201.9 |
| 2005/0151961 | A1 * | 7/2005 | McGraw et al. | 356/121 |
| 2006/0121893 | A1 * | 6/2006 | Tillotson et al. | 455/431 |
| 2007/0073486 | A1 * | 3/2007 | Tillotson et al. | 702/3 |
| 2009/0009393 | A1 | 1/2009 | Tillotson et al. | |
| 2009/0143988 | A1 | 6/2009 | Tillotson et al. | |
| 2009/0310118 | A1 * | 12/2009 | Halldorsson | 356/28 |

* cited by examiner

*Primary Examiner* — Shervin Nakhjavan
(74) *Attorney, Agent, or Firm* — Thompson Hine LLP

(57) ABSTRACT

A turbulence and winds aloft detection system may include an image capturing device for capturing a plurality of images of a visual feature of a selected celestial object; and an image processor configured to compare the plurality of images of the visual feature to detect a transit of a turbule of turbulent air between the image capturing device and the selected celestial object; compensate for one or more of apparent visual motion of celestial objects due to a planet's translation and rotation, the moon's revolution about the planet, and the atmosphere's refractive displacement of celestial objects; and compute a measurement of at least one of a velocity of the turbule and a height of the turbule relative to the planet.

21 Claims, 11 Drawing Sheets

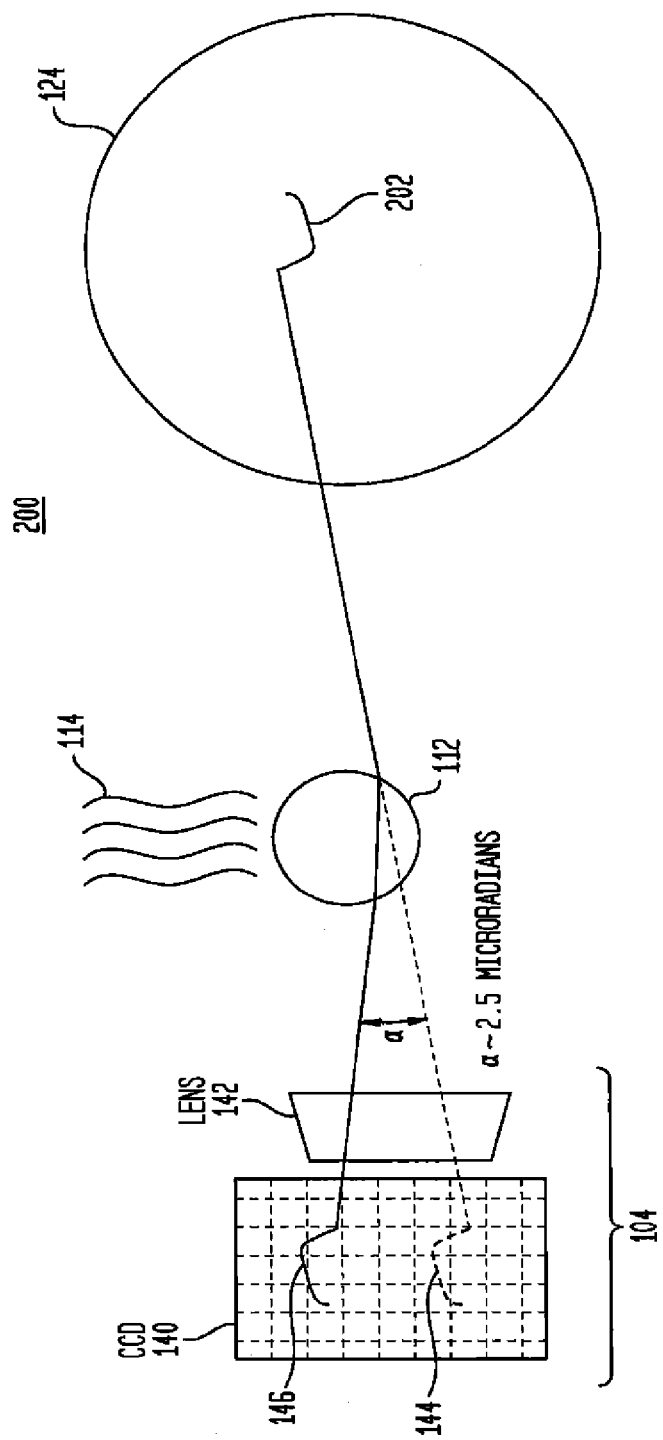

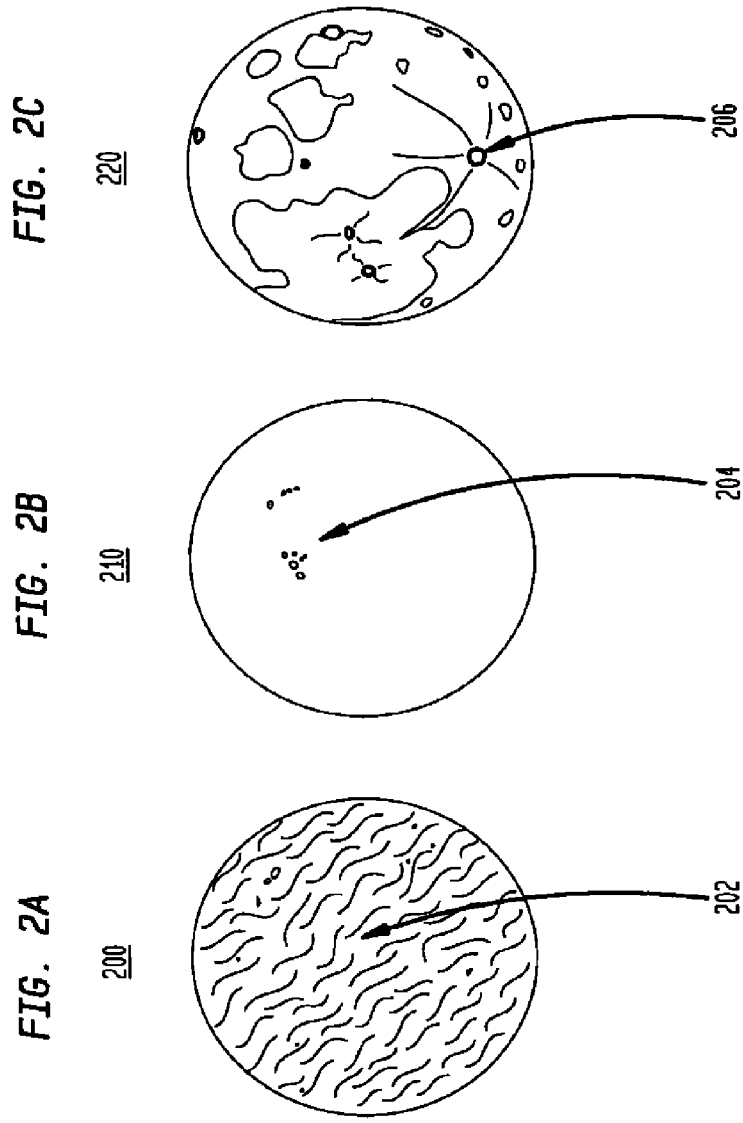

IMAGE 2-1

IMAGE 3-2

IMAGE 4-3

US 9,068,884 B1

TURBULENCE AND WINDS ALOFT DETECTION SYSTEM AND METHOD

FIELD

Embodiments of the subject matter described herein relate generally to a system and method for estimating turbulence and winds aloft in the atmosphere, and in particular to using a camera-based system to develop turbulence and wind profiles of the atmosphere using features of celestial bodies.

BACKGROUND

Measuring atmospheric conditions including turbulence and winds aloft allows aircraft and airborne vehicles to make flight adjustments to achieve a desired level of performance and avoid undesirable flying conditions. Winds aloft affect the fuel consumption and speed of aircraft. Airplane encounters with clear air turbulence at cruise altitude may produce serious injury. Clear air turbulence is difficult to forecast and even more difficult to detect with current methods. Clear air turbulence is turbulence that results where there are no clouds, precipitation, or visible particles such as dust in the air.

In addition, measuring the present state of atmospheric conditions is necessary to forecast future atmospheric events such as storms. Measuring atmospheric conditions can be performed to varying degrees using ground-based instrumentation, by sensors carried aloft in balloons or other airborne vehicles, by sensors in aircraft as they pass through a region of atmosphere, and by using predictive modeling based on past measurements.

However, over oceans and in underdeveloped regions of the world, ground-based instrumentation and dedicated sensor equipment like weather balloons either do not exist or it may be economically impractical to cover an area with sufficient sensors to provide the desired level of accuracy. Additionally, aircraft may pass through an area too infrequently to provide current conditions for other later aircraft. Dynamic atmospheric conditions generally make modeling grow less precise over time, and although good for approximating general conditions for regional conditions, modeling can be inaccurate at finer granularities. Sensors, and especially fixed instrumentation, are limited to surveying portions of the atmosphere proximate to the sensor apparatus at the time the sensor measurements were made. A moving aircraft or airborne vehicle may travel through multiple overlapping zones of coverage and areas without coverage during a flight.

SUMMARY

In one embodiment, a turbulence and winds aloft detection system may include an image capturing device for capturing a plurality of images of a visual feature of a selected celestial object; and an image processor configured to compare the plurality of images of the visual feature to detect a transit of a turbule of turbulent air between the image capturing device and the selected celestial object; compensate for one or more of apparent visual motion of celestial objects due to a planet's translation and rotation, the moon's revolution about the planet, and the atmosphere's refractive displacement of celestial objects; and compute a measurement of at least one of a velocity of the turbule and a height of the turbule relative to the planet.

In another embodiment, a turbulence and winds aloft detection system may include an image capturing device for capturing a plurality of images of a visual feature of a selected celestial object; a device for sensing motion of the image capturing device relative to the Earth; and an image processor configured to compare the plurality of images of the visual feature to detect a transit of a turbule of turbulent air between the image capturing device and the selected celestial object, receive a signal from the motion sensing device to continuously estimate a velocity of the image capturing device relative to the Earth, and compute a measurement of at least one of a velocity of the turbule relative to the Earth and a height of the turbule relative to the Earth.

In yet another embodiment, a method of detecting turbulence and winds aloft may include capturing a plurality of images of a visual feature of a selected celestial object; comparing the plurality of images to detect the transit of a turbule of turbulent air in front of the selected celestial object; and processing the plurality of images to compensate for one or more of apparent visual motion of celestial objects due to a planet's translation and rotation, the moon's revolution about the planet, and the atmosphere's refractive displacement of celestial objects; and computing a measurement of at least one of an angular velocity of the turbule and the height of the turbule.

In still another embodiment, a method of detecting turbulence and winds aloft may include capturing a plurality of images of a visual feature of a selected celestial object with an image capturing device; sensing motion of the image capturing device relative to the Earth; processing the plurality of images of the visual feature to detect a transit of a turbule of turbulent air between the image capturing device and the selected celestial object; using sensed motion of the image capturing device to continuously estimate a velocity of the image capturing device relative to the Earth; and computing a measurement of at least one of a velocity of the turbule relative to the Earth and a height of the turbule relative to the Earth.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method for measuring the turbulence and winds aloft in the atmosphere using solar and lunar observable features. A brief description of each figure is provided below. Elements with the same reference number in each figure indicate identical or functionally similar elements. Additionally, the left-most digit(s) of a reference number indicate the drawing in which the reference number first appears.

FIG. 1B is a diagram of a granule of the sun being focused onto a charge coupled device through a lens and the effect of a turbule on the position of the granule in the image;

FIG. 2A is a picture of the sun seen through a helium I filter;

FIG. 2B is a picture of the sun seen through a hydrogen alpha filter;

FIG. 2C is a picture of the moon seen through a polarizing filter;

DETAILED DESCRIPTION

Figure 1A:
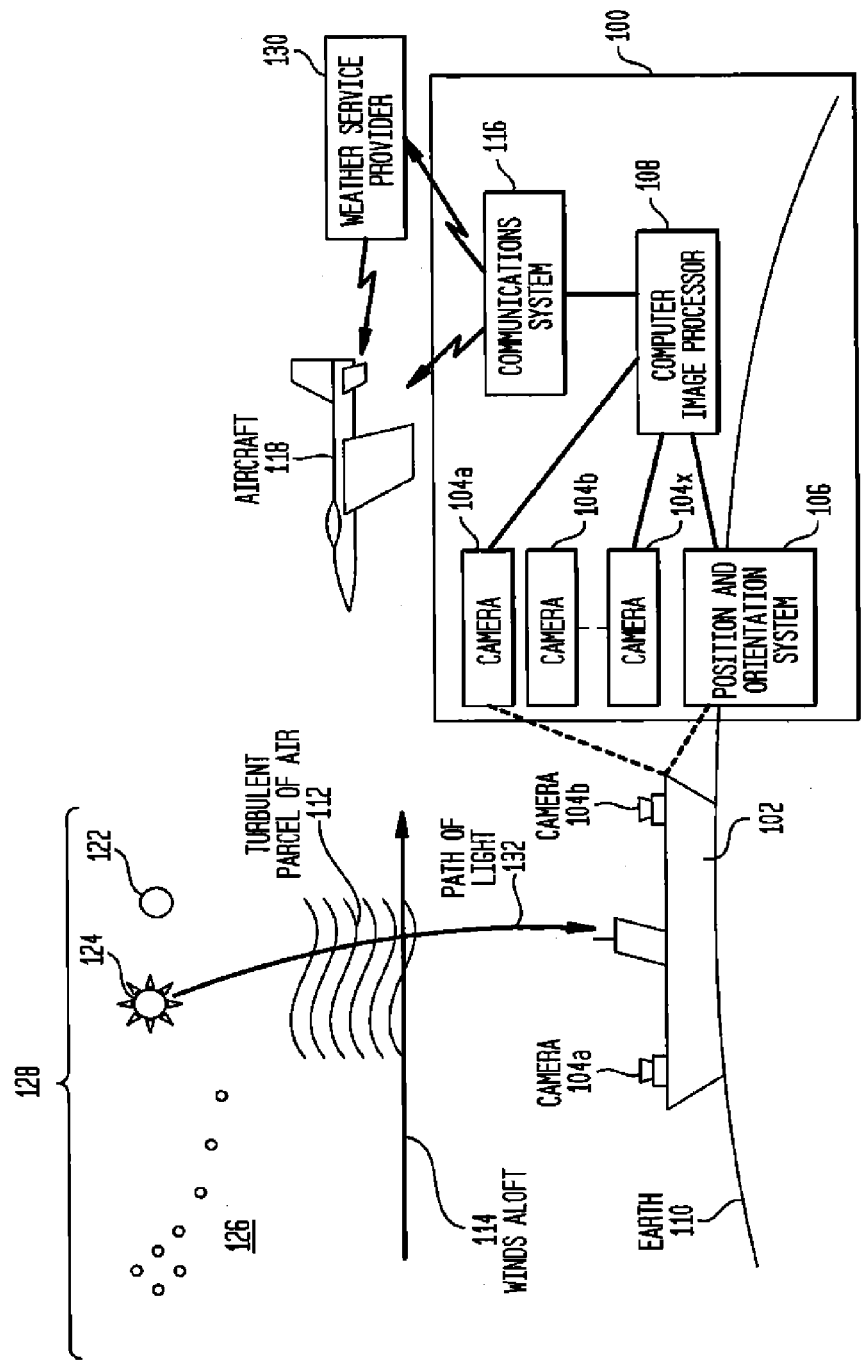
FIG. 1A is a diagram of a turbulence detection system on a ship traversing the earth, an aircraft in flight above the earth, and the relationship of the ship and the aircraft in relation to winds aloft and celestial objects.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Clear air turbulence is difficult to forecast and even more difficult to detect using current methods. Clear air turbulence is turbulence that results where there are no clouds, precipitation, or visible particles such as dust in the air. Pilots may learn of clear air turbulence from forecasts and other pilots that have recently flown through a pocket of turbulence. Generally, pilots turn on a "seat belt required" light and/or slow their aircraft's speed in anticipation of passing through suspected pockets of turbulence to reduce structural stresses on the aircraft and reduce discomfort to passengers. However, if the pilot is unaware of turbulence, the pilot may have little warning time to alert the passengers or otherwise change the configuration and velocity of the aircraft.

A turbulence and winds aloft measurement system 100 detects turbulence in the atmosphere and communicates it to pilots, which enables the pilots to maneuver their aircraft to avoid any turbulent pockets of air. In one embodiment, the turbulence and winds aloft measurement system 100 warns the pilot of turbulence in the path of the aircraft. In another embodiment, turbulence and winds aloft measurement system 100 provides a visual navigational aid to enable a pilot to navigate around pockets of turbulent air. The turbulence and winds aloft measurement system 100 may improve air safety, allowing airplanes to fly at cruise speeds with a reduced risk of running into unexpected turbulence that could damage the airplane or harm passengers. The turbulence and winds aloft measurement system 100 also may increase the comfort of passengers in the airplane by allowing the pilot to navigate around pockets of turbulence or, if the turbulence is widespread, by allowing the pilot to change the airplane's speed profile or configuration and navigate through the least turbulent areas of the sky. Further, reducing the amount of turbulence that an airplane flies through over the airplane's useful life may also reduce the stresses on airframe and engine components that accrue during a lifetime of continuous operation. The turbulence and winds aloft measurement system 100 therefore reduces component fatigue, permits safer long term operation of the aircraft, and reduces or shortens necessary maintenance cycles.

The turbulence and winds aloft measurement system 100 allows pilots use the winds aloft estimates to maneuver their aircraft to minimize the effect of headwinds and maximize tailwinds. Because winds aloft have a strong effect on airliner fuel consumption, measurements or predictions of winds aloft can be used to increase aircraft efficiency and maximize operating range.

System Components and Operation

As shown in FIG. 1A, a turbulence and winds aloft measurement system, generally designated 100, may obtain optical turbulence information of the atmosphere using observable features of the sun 124 and moon 122 or other celestial objects 128, for example a grouping of stars 126, such as a constellation or asterism, to predict atmospheric conditions in the parcel of atmosphere. The turbulence and winds aloft measurement system 100 may use distortions in visual measurements of observable features of the sun 124, moon 122, stars 126, or other celestial objects 128, such as planets and the position of moons around the planets, to measure and track refractivity fluctuations in intervening parcels of atmosphere. The refractivity fluctuations correspond to turbules 112 of turbulent air, and tracking the turbules 112 allows the turbulence and winds aloft measurement system 100 to determine the velocity of winds aloft 114. In addition to tracking turbules 112 or turbulence in general, the visual measurements can be used to improve atmospheric models, for example models of winds aloft 114, and thereby improve weather forecasts and/or aircraft routing.

In an embodiment, the turbulence and winds aloft measurement system 100 may include a mobile platform or vehicle 102, for example a ship, traversing a section of the earth 110, a first camera 104a, and a second camera 104b, a position and orientation system 106, and a computer 108. In embodiments, the mobile platform 102 may be a marine vessel, a land vehicle, a building or structure, an aircraft, a spacecraft, or any other stationary or mobile platform positioned with a view of the surrounding atmosphere.

The cameras 104a, 104b (collectively 104) may be mounted on or to the vehicle 102 and separated by a modest distance. In an embodiment, the cameras 104 may be mounted on different sides of the vehicle 102. A computer 108 may analyze images from the cameras 104. The computer 108 may be any suitable computing platform capable of manipulating digital image data, including but not limited to a PC, workstation, a customized circuit board, or an image processor. The cameras 104 may be communicatively linked to the computer 108 that receives the images from the cameras 104, either by hard wiring or wireless communications network, or may be a unitary device. In an embodiment, the computer 108 is physically located on the vehicle 102. In embodiments, the computer 108 may be physically located on another platform or operations center, for example at a weather service provider 130. In embodiments, data from cameras 104 may be networked to one or more computers via a network or plurality of networks.

In an embodiment, the cameras 104 may use a telephoto lens. In operation, the cameras 104 may be pointed at a celestial object 128 or a particular feature of a celestial object 128 having sufficient known detail, and a series of images or video may be delivered to the computer 108. In embodiments, the celestial object 128 may be the moon 122, the sun 124, a grouping of stars 126, planets, or planet and moons combination. For example, the stars 126 may be a well-known constellation of stars 126 such as the Pleiades, an asterism such as the Little Dipper, or any other grouping of stars having close proximity to one another. The particular feature of a celestial object may be an edge of a solar disc, a sunspot, a solar granule, an edge of a lunar disc, a lunar crater, a lunar mountain range, a lunar shadow, a relative position of each of the plurality of stars, and a position of moons about the planet. The cameras 104 may output digitized data of the image to the computer 108. In another embodiment, the computer 108 may digitize analog inputs from the cameras 104 into digital images using a digital frame grabber.

The images from the cameras 104 may be analyzed to detect small local deviations in the refractive index of air. For example, light returning to the cameras 104 from the sun 124 passes through the atmosphere along light path 132. Changes in refraction are due to the density and composition of air in the atmosphere, for example due to differences in humidity levels, temperatures, and pressures. As a result of the small local changes in refraction due to turbulence, features of the sun 124 can appear shifted spatially. The mean-square angular displacement of small features may be given by a well-known formula shown in Equation (1). In this formula, $\phi$ is the angular displacement in radians, angle brackets < > indicate the mean expected value of the enclosed quantity, D is the camera aperture, L is the total distance from the light source to the camera, $\eta$ is a measure of distance along the optical path from the light source to the camera, and $C_n^2$ is a measure of optical turbulence at each point along the path. $C_n^2$ is mathematically related to mechanical turbulence, which can pose a danger to aircraft.

$$<\phi^2> = 2.91 D^{-1/3} \int_0^L C_n^2(\eta) d\eta \qquad \text{Equation (1)}$$

Referring now to FIG. 1B, a telephoto lens 142 focuses light from the sun 124 through a helium I filter 200 onto a charge coupled device (CCD) 140. For purposes of illustration only, part of a granule 202 of the sun 124 may be shown on the CCD 140 as an inverted image 146. The inverted image 146 is where the granule 202 is resolved on the CCD 140 due the distortion caused by the turbule 112 carried in the winds aloft 114. The dashed inverted image 144 illustrates where the solar granule 202 will be imaged once the turbule 112 passes. Turbulence-induced deviations in the refractive bending of light can be on the order of three microradians or less, which may be too small to be detected accurately by many cameras 104 using normal snapshot lenses. To increase accuracy and provide a finer level of granularity, the cameras 104 in the turbulence and winds aloft measurement system 100 use a telephoto focusing system such as a lens or mirror having a long focal length that magnifies the image and provides a suitable resolution for imaging by the cameras 104.

In an embodiment, the telephoto lens 142 and the pixel resolution of the image capturing element, for example a CCD 140 or charge coupled device, are adapted to resolve at least 2.5 microradians of angle. For example, a telephoto lens having a 30-cm aperture and a 1-meter focal length can resolve approximately $2.5 \times 10^{-6}$ radians in visible wavelengths when coupled with a 1×1 cm CCD chip having 2.5 micron pixels arranged in a 4000×4000 pixel matrix. In one embodiment, the telephoto lens 142 is a zoom lens, capable of adjusting the magnification and therefore allowing the system operator to selectively trade off measurement accuracy for a wider field of view.

In an embodiment, the cameras 104 include a CCD 140 having a very fine pitch, or a similar image capturing means, which is used to gather an image, either alone or in combination with a telephoto lens. To maximize the resolution, the CCD 140 may be a black and white CCD. Color CCDs generally use tiny filters arranged in a pattern over the CCD elements, which can cause unwanted image artifacts such as color changes near sharp edges of object depending upon how the light falls onto the CCD chip. Edge artifacts are unwanted image distortions that have the potential of being misinterpreted by the computer. In other embodiments, the system uses a 3-CCD camera 104 that divides the image into three different CCDs, for example using birefringent materials, and therefore does not induce unwanted edge artifacts.

In embodiments, the cameras 104 may be digital frame cameras, video cameras, high-resolution CCD cameras, or HD camcorders. In embodiments, to enhance the image depth and dynamic range of the captured image, the cameras 104 selectively use filters, such as a solar filter, a hydrogen alpha filter, a helium I filter, a polarization filter, a neutral density filter, or a red filter to avoid backscattered blue light. In embodiments, the optical filters reduce the brightness and/or pass only selected wavelengths of light. In embodiments, the cameras 104 additionally may be infrared cameras or selectively use image intensifiers, such as a night vision tubes, to allow the turbulence and winds aloft measurement system 100 to perform better in low light situations such as when viewing unlit portions of the moon 122 or other celestial objects 128 at night time. In embodiments, the cameras 104 may be image capturing devices using a CCD chip, an analog sensor, a linear sensor such as a linear sensor array, or any other photosensitive sensor capable of determining fine pitch in a visual scene.

In an embodiment, the cameras 104 are mounted on a rotatable swivel mounts that allow the cameras 104 to be rotated to view different portions of the sky. In an embodiment, the cameras 104 are mounted on multi-axis gimbals, allowing the cameras 104 to be angularly rotated in any direction. In these embodiments, the cameras 104 may be rotated or oriented in order to scan a larger area. The outputs from the cameras 104 may be synchronized with an output from a rotational encoder or other similar orientation identifying means to correlate images from the cameras 104 with the orientation of the cameras 104.

The motion of the cameras 104 may be linked to the motion of the vehicle 102, for example through a position and orientation system 106, such as a navigation and control system, a global positioning satellite (GPS) receiver, an inertial measurement unit (IMU), or any similar system or combination of systems. The IMU measures changes in camera 104 orientation due to rotation or twisting of the vehicle 102 and may be used to maintain orientation of the cameras 104 toward a desired celestial object 128. In an embodiment, one or both of the cameras 104 may be substantially fixed and a rotatable mirror is used to change the direction of viewing of or more of the cameras 104. In an embodiment, the mirrors may be first surface mirrors for better clarity. In an embodiment, the cameras 104 may be mounted in vibration reducing mounts. In an embodiment, the cameras 104 may be gyroscopically stabilized.

Image Processing

Continuing to refer to FIG. 1A, the computer 108 processes one or more images from the cameras 104. The processing identifies visual features whose physical location is well known, e.g., features on the sun 124 or moon 122. The sun 124 and the moon 122 both have visible features that can be distorted by turbulence in ways that allow detection of the turbulence.

Referring now to FIG. 2C, the lunar features 206 of the moon 122, including mountains and craters, are well known and are static. However, different portions of the moon 122 are illuminated by the sun 124, depending upon the particular lunar phase. The angle of illumination of lunar features 206 by the sun 124 also varies with the particular lunar phase, creating shadows that vary with the particular lunar phase. Polarizing filters and neutral density filters can be used to enhance the resolving capability of the cameras 104. The moon 122 is shown in FIG. 2C using a polarizing filter 220. The moon 122 also wobbles slightly, thus allowing slightly more than half of the surface of the moon 122 to be usable as visual features.

Referring to FIGS. 2A and 2B, to detect features of the sun 124, special filters such as solar filters, hydrogen alpha filters, helium I filters, etc. are utilized. Using solar filters, features such as the edge of the sun 124 and sunspots 204, when present, can be resolved by the cameras 104. Using filters such as helium I filters 200 and hydrogen alpha filters 210, the sun 124 also presents full-time surface features during daylight hours called "granules" 202. FIGS. 2A and 2B show granules 202. Granules 202 are always present, are easily observable with a telephoto lens and a narrowband spectral filter and have a fine-grained texture. The sun 124 is shown in FIG. 2A using a helium I filter 200. The sun 124 is shown in FIG. 2B using a hydrogen alpha filter 210. Granules 202 provide a good background against which to detect turbules 112.

Referring again to FIG. 1A, using the spatial position (in pixel rows and columns) of each visual feature on the focal plane, the pitch of pixels in the camera focal plane, and the focal length of the lens, the computer 108 measures the angular position of those visual features in the scene. The computer 108 may compare the visual features in a plurality of frames to detect changes in the angular position of those features. The changes in angular position may be caused by differences in the refractivity of the atmosphere due to turbulence, or turbules 112, and winds aloft 114. For ease of exposition, the following examples use the sun 124 as the background object for detecting turbules 112 and winds aloft 114, however any celestial object 128 including the moon 122, the sun 124, stars 126 and planets may be utilized with appropriate lenses and filters.

The computer 108 processes a series of time-tagged frames from each camera 104. When no clouds or turbulence is present in the field of view, each frame will look essentially the same as the next frame from the same camera 104. For example, two consecutive frames of the sun 124 will look essentially the same, with a slight change in position of the sun 124 due to the ordinary movement of the sun 124 relative to the earth 110. When turbulence is present, however, some parts of the sun 124 will appear distorted, and the distortion will vary from frame to frame. A feature in one frame captured at time $t_0$ cannot be easily registered with that feature in a later frame at time $t_0+\Delta t$.

Registering features in one frame with the same features in another frame involves using linear image transformation methods. In a comparison between a two frames, for example a frame at time $t_0$ and a frame at time $t_0+\Delta t$, features in one frame can be easily registered with similar features in another frame using simple geometric transformations. In one embodiment, the computer 108 performs a transformation of a first frame at time $t_0$ into a predicted subsequent frame, and compares the predicted subsequent frame with the actual subsequent frame at time $t_0+\Delta t$. In another embodiment, the computer 108 performs a similar process but transforms the subsequent frame into a predicted first frame. However, transforming the subsequent frame has the disadvantage that the system must wait until the subsequent frame is received by the computer 108 before performing the transformation, creating a possible time lag.

In another embodiment, both a first and a subsequent frame may be transformed to an internal standard frame format used by the computer before being compared. This embodiment has the advantage in that each frame may be transformed independently of any camera-related artifacts of the other frame and simplifying computations. For example, using an internal standard frame, each frame can be different in terms of angle, rotation, zooming, and aperture and then mapped to the angle, rotation, zoom level and aperture of the internal standard frame. Further, using the internal standard frame simplifies comparing frames from different cameras 104, which may have different focal lengths or may look at the same scene from different angles, for example if two cameras 104 are mounted on opposite sides of a ship, or vehicle 102.

To perform the transformation, the computer 108 performs an estimate of the motion of the vehicle 102 including changes in direction and orientation, for example by using information from an onboard inertial navigation system and/or a GPS system. The computer 108 also may perform an estimate of the motion of the feature, for example the small changes in position of the sun 124 or moon 122 relative to the earth 110. The computer 108 uses the motion estimates along with the time between the frames, $t_0$ and $t_0+\Delta t$ to perform a transformation of features in one or both frames. The computer 108 registers the frames by adjusting the size, position, and orientation of the feature in one or both of the frames, for example by registering the features in frame at $t_0$ to the feature in the frame at $t_0+\Delta t$. In this example, the frame at $t_0$ is digitally translated, scaled, and rotated so that features in frame at $t_0$ are aligned with matching features in the frame at $t_0+\Delta t$.

After image registration methods are applied, any mismatch between frames from a camera 104 indicates temporary distortion caused by turbulence or darkening due to clouds. Clouds can be distinguished from turbulence as clouds decrease the overall brightness in an image, whereas distortion caused by turbulence rearranges the brightness, but does not generally decrease the overall brightness in the frame. In one embodiment, the computer 108 eliminates frames containing clouds. In another embodiment, the computer 108 uses only those features in the frame where the moon 122 or sun 124 is not blocked by clouds.

Figure 3C:
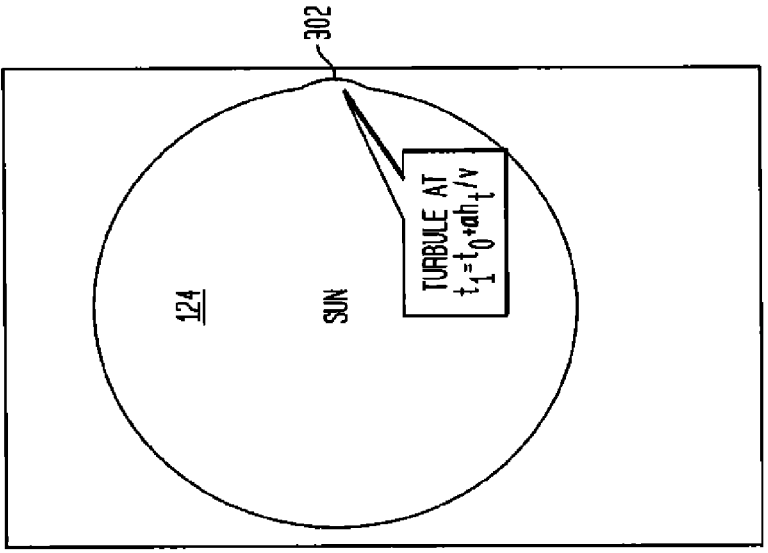
FIG. 3C is an exaggerated view of the effect that a turbule of turbulent air has on the edge of the sun's disc as visualized by the camera system.
Figure 3B:
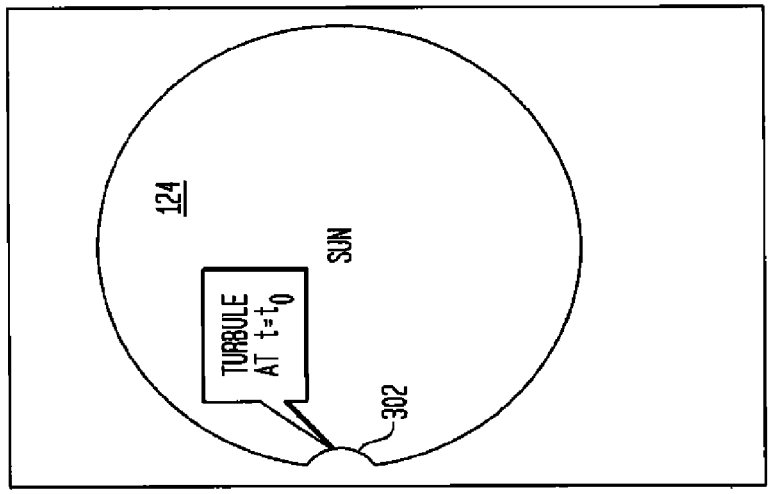
FIG. 3B is an exaggerated view of the effect that a turbule of turbulent air has on the edge of the sun's disc as visualized by the camera system.
Figure 3A:
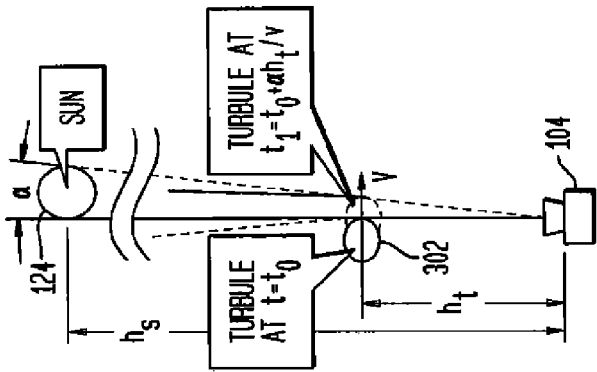
FIG. 3A is a diagram illustrating the geometry of camera system visualizing a turbule of turbulent air as it passes in front of the sun.

Referring now to FIG. 3B, in one embodiment, a camera 104 (FIG. 3A) observes a turbule 302 encroach on the edge of the sun 124 at time $t_0$. Referring now to FIG. 3C, at a later time, $t_1=t_0+\Delta t$, the camera 104 images the turbule 302 begin to exit the other edge of the sun 124. Referring now to FIG. 3A, the interval $\Delta t$ depends on three variables: the angular width, $\alpha$, of the sun 124; the distance to the turbule 302 or height, $h_t$; and the velocity, v, of the turbule 302. The distance to the sun 124, or $h_s$, is known, and $\alpha$ is also known. Given $\Delta t$, the ratio of $h_t$ and v can be computed using trigonometry. In one embodiment, the values for $h_t$ and v are estimated, for example based upon expected values such as the expected velocity or expected height of the jet stream.

Figure 4B:
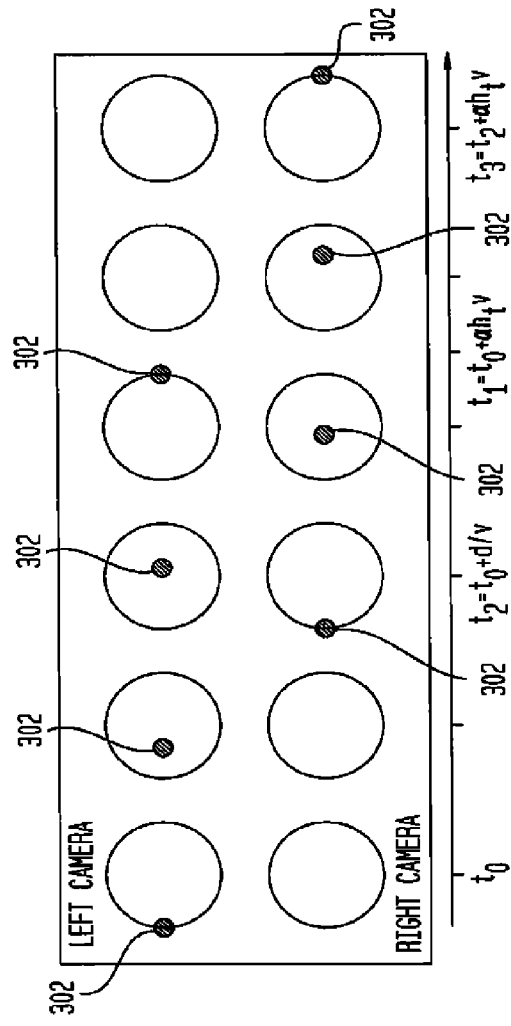
FIG. 4B is a diagram illustrating the differences in turbule position as imaged by two cameras displaced by distance d.
Figure 4A:
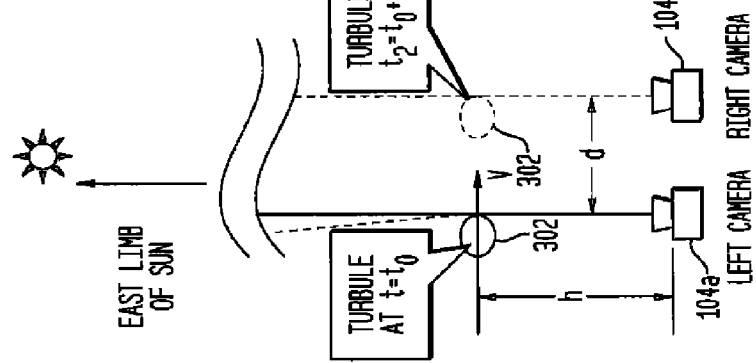
FIG. 4A is a diagram of a two camera system for visualizing turbules and determining the distance to the turbules.

In another embodiment, two cameras 104 may be utilized to determine the distance $h_t$ to the turbule 302, which allows determining the value of the velocity, v, of the turbule 302. Referring now to FIG. 4A, left camera 104a is separated from right camera 104b by distance d, for example by mounting the left camera 104a and right camera 104b, collectively cameras 104, on opposite ends of the vehicle 102. Note that although two cameras 104 are described as an exemplary embodiment, it is also possible to perform the operation using additional cameras 104, or even a single camera 104 capable of imaging a feature from two or more vantage points, for example using lenses, mirrors, or fiber optics.

Continuing to refer to FIG. 4A, and now referring to FIG. 4B, for purposes of illustrating an aspect of the invention, a simplified embodiment of the system is shown as follows: left camera 104a and right camera 104b are shown in a line that is approximately horizontal and the sun 124 is in a vertical orientation perpendicular to the line between the cameras 104. Turbule 302 is shown moving parallel to the line between the cameras 104, in a direction from left to right. As turbule 302 crosses in front of the sun 124, the left camera 104a will detect distortion caused by the turbule 302 at time $t_0$ before the right camera 104b detects the distortion at time $t_2=t_0+\Delta t$, where $\Delta t$ is equal to distance between the cameras 104, d, divided by the velocity of the turbule, v. (All vectors in the following equations are denoted in bold.) Because $t_2$, $t_0$, and d can be measured, v is computed as follows:

$$v=d/(t_2-t_0).$$ Equation (2)

Once the turbule transits the feature at time $t_1=t_0+\alpha h_t/v$ for left camera 104a, or time $t_3=t_2+\alpha h_t/v$, then $h_t$ can be computed by either $$h_t=(t_1-t_0)v/\alpha$$ Equation (3)

or $$h_t=(t_3-t_2)v/\alpha$$ Equation (4)

and therefore both the height $h_t$ or distance to the turbule 302, and the velocity vector, v, of the turbule 302 can be computed. The computer 108 uses the distance to the turbule 302 and the angle to the turbule 302 to determine the altitude of the turbule 302 relative to the earth 110. Although this example assumes the sun 124 is directly above the cameras 104, it will be apparent to those skilled in the art that the sun 124 or other celestial objects 128 may be viewed at any angle from vertical to nearly horizontal, and at any azimuth relative to the vector d connecting the two cameras 104, and that suitable trigonometry formulas may be used to compute the correct height, $h_t$, and velocity vector, v, of the turbule 302.

Figure 5A:
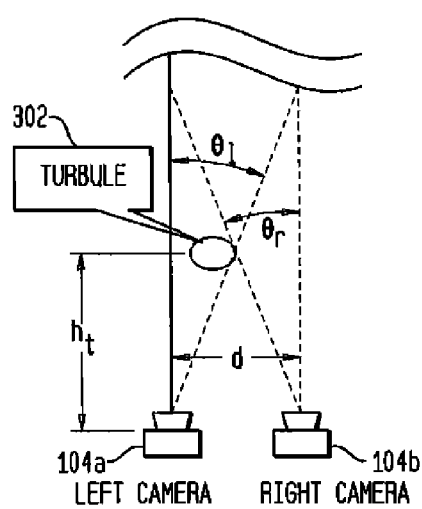
FIG. 5A is a alternative diagram of the geometry of a two camera system for visualizing turbules and determining the distance to the turbules.
Figure 5B:
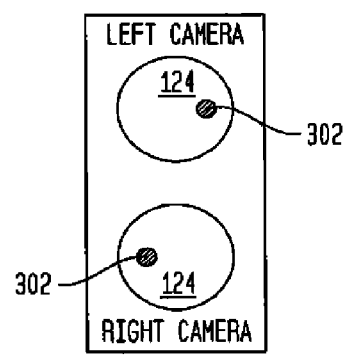
FIG. 5B is an alternative diagram illustrating a method of visually determining the angular offset between two cameras that are visualizing the same turbule from separated viewing positions.

Referring now to FIGS. 5A and 5B, an alternative mathematical approach is to determine the offset angle θ of the turbule 302 from the center of the sun 124 by both cameras 104. Left camera 104a images an offset of $θ_l$ and right camera 104b images an offset of $θ_r$. The angular difference between turbule 302 measured positions by each camera 104 is $\Delta θ=θ_l-θ_r$, and $h_t$ can be computed as $$h_t \cong d/\Delta θ$$ Equation (5)

where all angles are in radians and are assumed to be smaller than 0.1 radian. A turbule's 302 measured angular speed w relative to the cameras 104 is computed by measuring the time $\Delta t$ for turbule 302 to transit the angular width a of the sun 124. The turbule 302 velocity vector v is computed as $$v=\omega/h_t.$$ Equation (6)

In practice, turbules 302 may be irregularly shaped, there may be multiple turbules 302, and each turbule 302 may appear at a different altitude with a different wind speed and direction. The following embodiments correlate image features to resolve individual turbules 302 within a sequence of images taken by a single camera 104 and between images taken by two or more cameras 104.

In Equation (6), the symbol ω refers to the measured angular velocity of a turbule about the camera's location. That measurement treats the sun and the moon as unmoving background images with known angular widths α, so the angular velocity ω is computed as angular width α divided by the time it takes for individual turbules to cross from one side of the sun (or moon) to the other.

When observing turbules in front of distant celestial bodies, one may assume the angular velocity of the background object is zero relative to the Earth's surface. However, to be more precise, the movement of celestial objects may be considered. For example, distant celestial bodies like the Pleiades move across the sky at the Earth's sidereal rotation rate of one rotation (i.e., 2π radians) per 23.93447 hours, multiplied by the cosine of the object's celestial latitude. The sun also moves across the sky due to the Earth's rotation, but with a small correction (about one part in 365.24) due to the Earth's motion about the sun. Further, the Earth's velocity changes from aphelion to perihelion, and with its orbital position relative to the moon, so this correction varies slightly throughout the year. Various embodiments may use appropriate levels of detail in calculating the sun's angular velocity.

The moon moves across the sky due to the Earth's rotation, but with a substantial correction (about one part in 29.53) due to the moon's revolution about the Earth. The moon's velocity changes from apogee to perigee, and its velocity relative to the Earth is confounded by other influences like the sun's gravity, so this correction varies slightly throughout the month and throughout the year. Various embodiments may use appropriate levels of detail in calculating the moon's angular velocity.

Besides these actual motions that shift celestial objects across the sky, there is an apparent motion that becomes significant when celestial objects are near the horizon. This motion is due to refractive bending of light by the Earth's atmosphere. Dense air at low altitudes has a higher index of refraction than thin air at high altitude. Light from a celestial object curves downward as it traverses the atmosphere. This makes objects near the horizon appear higher than they actually are. The apparent path of a celestial object across the sky bends upward as the object approaches the horizon.

Accordingly, in an embodiment, the camera 104 and image processor 108 (FIG. 1) measure the angular velocity ω of the turbule 112 relative to the Earth's surface 110, rather than relative to the sun, moon, planets, planets and their moons, or an asterism or constellation such as the Pleiades. To do this, the image processor 108 still visually measures the apparent angular velocity of the turbule 112 relative to the celestial background object 128 as previously described, but the image processor then corrects this measurement by adding the angular velocity of the celestial background object, which it computes using information about celestial mechanics and atmospheric refraction. This correction gives the "true" angular velocity ω of the turbule relative to a fixed position on the Earth's surface.

Correlation of Images from a Camera

Figure 6A:
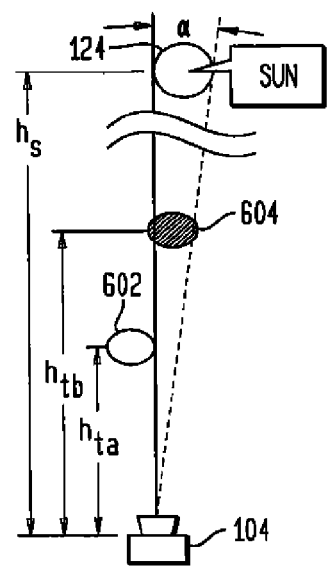
FIG. 6A is a diagram illustrating two different altitudes and paths taken by two different turbules.
Figure 6B:
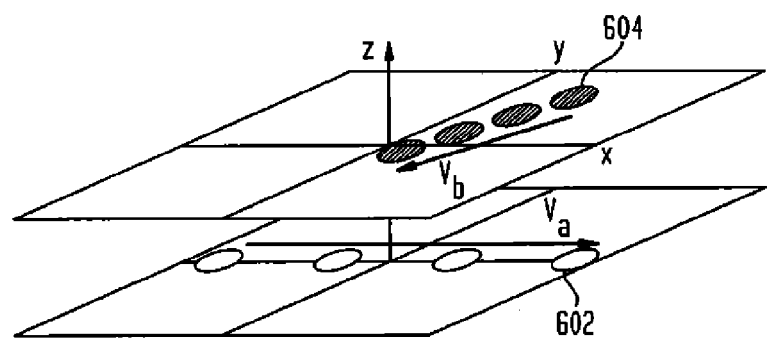
FIG. 6B is a graph showing the paths of the two turbules that are at different altitudes.

Referring now to FIGS. 6A and 6B, a first turbule 602 moves in a first direction at velocity $v_a$, shown in FIG. 6B as generally traveling in the direction of the x-axis, and a second turbule 604 moves in a second direction at velocity $v_b$, shown in FIG. 6B as traveling more or less in the direction of the y-axis. To distinguish the data associated with the first turbule 602 from data associated with the second turbule 602, a mathematical correlation operation is performed to the data.

The correlation coefficient for two data sets, $x_i$ and $y_i$, each having N elements, is defined as $$r = s_{xy}/s_x s_y,$$ Equation (7)

where $s_x$ and $s_y$ are the standard deviations of $x_i$ and $y_i$ and where $s_{xy}$ is the covariance of x and y, defined as $$s_{xy} = (\Sigma x_i y_i - 1/N \Sigma x_i \Sigma y_i)/(N-1)$$ Equation (8)

where all sums are over the range I=1 . . . N.

For a pair of images x and y, where each image in an $m_x n$ array of pixels indexed by $$\{(j,k): j=a \ldots m, k=1 \ldots n\},$$ Equation (9)

let $N = m_x n$ and the summation index $I = j + m(k-1)$. Then the correlation coefficient of two images is defined as $$r = s_{xy}/s_x s_y$$ Equation (10)

where $$s_{xy} = (\Sigma \Sigma x_{j,k} y_{j,k} - 1/N \Sigma \Sigma x_{j,k} \Sigma o y_{i,k})/(N-1)$$ Equation (11)

and all double sums are over the range j=1 . . . m, k=1 . . . n.

Figure 7A:
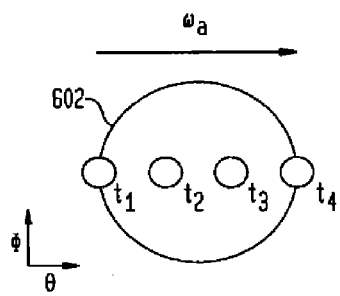
FIG. 7A are images captured by a camera of a first turbule at four different time intervals as it transits in front of the sun.
Figure 7B:
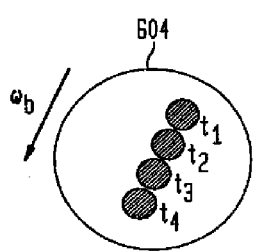
FIG. 7B are images captured by a camera of a second turbule at four different time intervals as it transits in front of the sun.
Figure 7C:
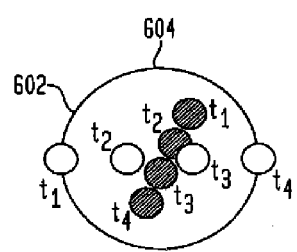
FIG. 7C are images captured by a camera showing the relative paths of a first turbule and a second turbule at four different times intervals as they transit in front of the sun.

The sequences of difference images from a single camera are correlated to reveal the magnitude and angular velocity of turbulence at various altitudes. Continuing to refer to FIGS. 6A and 6B, and now referring now to FIGS. 7A, 7B and 7C, first turbule 602 is at height $h_{ta}$ and second turbule 604 is at height $h_{tb}$. Both the first turbule 602 and the second turbule 604 are moving across the visible disc of the sun 124 at the same time, but in two different directions x, y, and at two different velocities, $v_a$, $v_b$ respectively. The images in FIGS. 7A, 7B, and 7C illustrate the turbules 602, 604 at four different times, $t_1$, $t_2$, $t_3$, $t_4$.

Figure 8A:
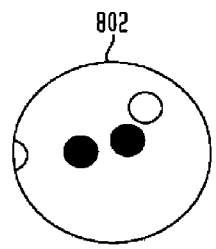
FIGS. 8A, 8B, and 8C are images of the differences between two consecutive images of the two turbules of FIG. 7C.
Figure 8B:
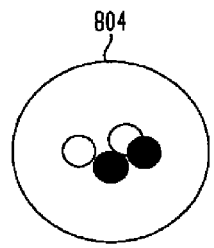
Figure 8C:
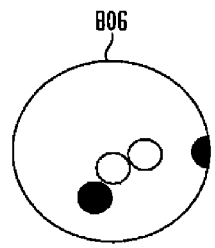

Referring now to FIGS. 8A, 8B and 8C, in an embodiment, the turbulence and winds aloft measurement system 100 computes a sequence of difference images 802, 804, and 806, at various temporal and angular offsets. The first difference image 802 is the difference between the image frame that captured first turbule 602 and second turbule 604 at time $t_1$, and the image frame that captured first turbule 602 and second turbule 604 at time $t_2$. Similarly, second difference image 804 is the difference between the images when turbules 602, 604 are at times $t_2$ and $t_3$, and third difference image 806 is the difference image between times $t_3$ and $t_4$. As is understood in the art, an angular offset in the scene corresponds to a pixel offset in the digital image. The angle is proportional to the number of pixels by which the image is offset, multiplied by the spatial width of a pixel, divided by the focal length of the lens. The temporal offset is the difference between the times when the difference images were captured. An angular offset θ combined with a temporal offset Δt corresponds to an angular velocity of $$\omega = \theta/\Delta t.$$ Equation (12)

Figure 9A:
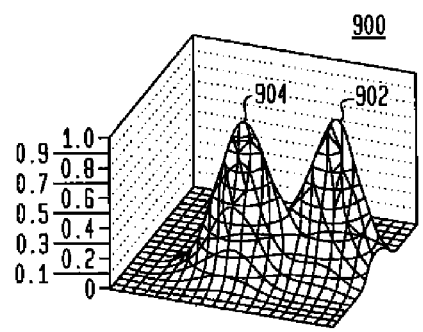
FIGS. 9A and 9B are contour plots showing the correlation of the angular velocities of the two turbules computed from the difference images of FIGS. 8A, 8B, and 8C.
Figure 9B:
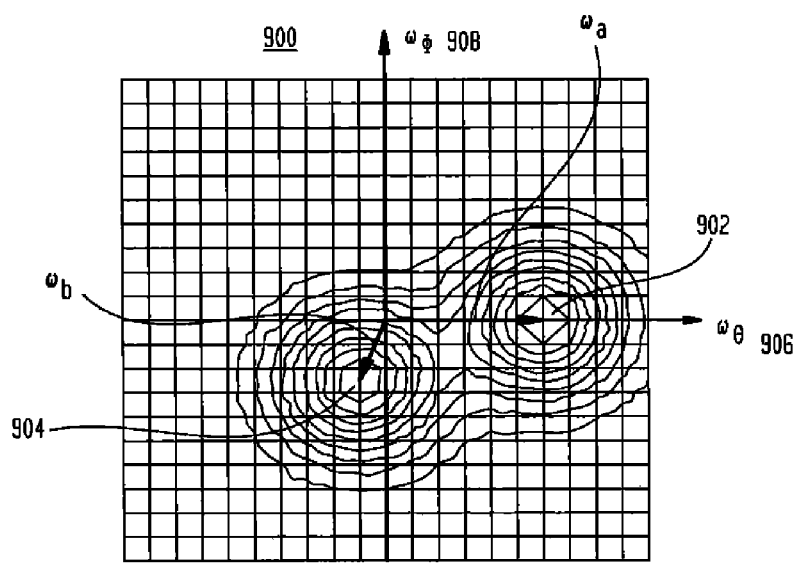

When the temporal and angular offsets match the angular velocity of turbules 602, 604 at a particular altitude $h_{ta}$, $h_{tb}$, there is a peak in the correlation coefficient, $r(\omega_\theta, \omega_\phi)$, Referring now to FIGS. 9A and 9B, the correlation contour plots illustrate the correlation $r^2(\omega_\theta, \omega_\phi)$ 900 of the difference images 802, 804, and 806 for angular velocity vectors $\omega_\theta$ 906, and $\omega_\phi$ 908. The correlation contour plots have two peaks 902, 904. The peaks 902, 904 represent the angular velocities of the turbules 602, 604 with one peak corresponding to $\omega_a$ 902 and one peak corresponding to $\omega_b$ 904. To measure the linear velocities $v_a$, $v_b$ of the turbules 602, 604 requires knowledge of the altitudes $h_{ta}$ and $h_{tb}$.

In the previously discussed embodiment, methods are presented to derive v, the velocity of a turbule 112 (FIG. 1) relative to the camera 104, simultaneously with h, the height of a turbule relative to the camera. The velocity of the camera 104 was assumed to be zero relative to the Earth's surface.

In another embodiment (FIG. 1), the cameras 104a and 104b may be mounted on a moving platform 102 such as an ocean-going vessel. The platform 102 may have a nonzero mean velocity $v_{platform}$, and the action of wind and waves (in the case of an ocean-going vessel) may cause the platform to pitch, roll, yaw, heave, sway, and surge so that each camera 104a, 104b may have a time-varying velocity $v_{camera}$. This affects the apparent angular velocity ω of a turbule relative to the camera, especially if $v_{camera}$ is relatively large compared to the turbule velocity v.

With this other embodiment, the system 100 may include an image processor 108 configured to continuously estimate $v_{camera}$, from data received from the position and orientation system 106, that may include a GPS receiver and/or accelerometers mounted near the camera 104 on the platform 102. This embodiment may use this measured camera velocity $v_{camera}$ to correct its estimate of turbule velocity v and height h. Referring again to FIG. 4A and FIG. 4B, left camera 104a and right camera 104b are shown in a line that is approximately horizontal and the sun 124 is in a vertical orientation perpendicular to the line between the cameras 104. However, in a case in which both cameras 104a, 104b are moving with velocity $v_{camera}$ to the right (not shown), turbule 302 may move parallel to the line between the cameras 104a, 104b in a direction from left to right. As turbule 302 crosses in front of the sun 124, the left camera 104a may detect distortion caused by the turbule 302 at a time $t_0$ before the right camera 104b detects the distortion at time $t_2 = t_0 + \Delta t$, where Δt is now equal to distance between the cameras 104a, 104b, d, divided by the difference between the velocity of the turbule, v, and of the cameras $v_{camera}$. Because $t_2$, $t_0$, and d can be measured, v is computed as follows:

$$V = d/(t_2 - t_0) + v_{camera}$$ Equation (12)

Once the turbule transits the feature at time $t_1 = t_0 + \alpha h t/(v - v_{camera})$ for left camera 104a, or time $t_3 = t_2 + \alpha h_t(v - v_{camera})$, then $h_t$ can be computed by either $$h_t = (t_1 - t_0)(v - v_{camera})/\alpha \qquad \text{Equation (13)}$$

or $$h_t = (t_3 - t_2)(v - v_{camera})/\alpha \qquad \text{Equation (14)}$$

and there both the height $h_t$ or distance to the turbule 302, and the velocity vector v of the turbule 302 can be computed. The computer 108 uses the distance to the turbule 302 and the angle to the turbule 302 to determine the altitude of the turbule 302 relative to the Earth 110. Although this example assumes the sun 124 is directly above the cameras 104, it will be apparent to those skilled in the art that the sun 124 or other celestial objects 128 may be viewed at any angle from vertical to nearly horizontal, and at any azimuth relative to the vector d connecting the two cameras 104a, 104b, and that suitable trigonometry formulas may be used to compute the correct height, ht, and velocity vector v, of the turbule 302.

The camera 104 on a moving platform 102 also may have a time-varying angular velocity due to the platform's rotation (pitch, roll, and yaw). To visually measure the angular velocity of an object relative to the Earth's surface 110, the angular velocity of the camera would have to be subtracted from the angular velocity of the object. However, with this embodiment, the angular velocity of each turbule 112 is measured with respect to a celestial object 128 whose angular velocity is known, so no correction for the camera's angular velocity is needed.

Correlation of Images from Cameras

Figure 10A:
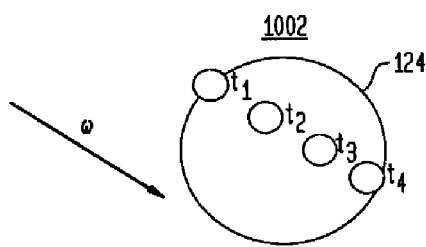
FIGS. 10A and 10B are images of left and right camera sequences respectively of a turbule transiting in front of the sun where the turbule is imaged by both the left and right cameras during a common interval of time.
Figure 10B:
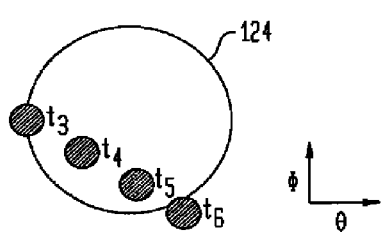

To compute the altitudes $h_{ta}$ and $h_{tb}$ and the linear velocities $v_a$, $v_b$ of the turbules 602, 604, the positions of the turbules 602, 604 are triangulated using two or more cameras 104. Referring now to FIGS. 10A and 10B, a turbule 1002 moves at angular speed ω across the sun 124. FIG. 10A illustrates the imaging of the turbule 1002 by a first camera 104A at times $t_1$, $t_2$, $t_3$, and $t_4$ as the turbule 1002 transits the sun 124. FIG. 10B illustrates the imaging of the same turbule 1002 by the second camera 104A at times $t_3$, $t_4$, $t_5$, and $t_6$.

Figure 11:
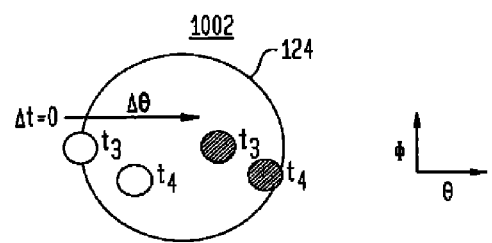
FIG. 11 is an illustration of the use of angular offset to correlate the images of the turbule when the turbule is imaged by both cameras during a common interval of time.

Referring now to FIG. 11, the turbule 1002 is visible to both cameras 104 during times t3 and t4. To measure the angular offset Δθ, or spatial shift of the position of the turbule 1002, the difference image from one of the cameras 104 is shifted along the direction of the other camera 104, and the correlation coefficient r(Δθ) is computed at various angular distances Δθ. The distance Δθ at which a correlation peak occurs reveals the altitude $h_t$ of the turbule 1002 relative to the camera 104, as given by $h_t \cong d/\Delta\theta$ (Equation (5)).

Figure 12A:
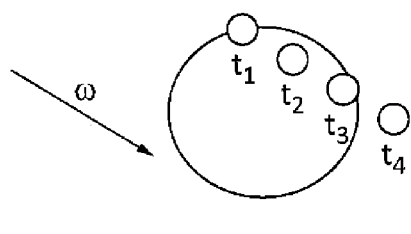
FIGS. 12A and 12B are images of left and right camera sequences respectively of a turbule transiting in front of the sun where the turbule is not visible to both cameras during a common interval of time.
Figure 12B:
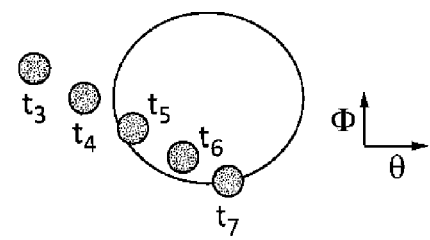

Referring now to FIGS. 12A and 12B, the turbule 1002 is not visible to both cameras 104 at the same times, $t_1$-$t_7$. The turbule is visible to camera 104a during times $t_1$, $t_2$, $t_3$, and $t_4$; and the turbule is visible to camera 104b during times $t_5$, $t_6$, and $t_7$. There is therefore no angular offset Δθ that allows a correlation peak in r(Δθ) to match the turbule 1002 images from both cameras 104. Instead, the difference images from one camera 104 are correlated with the difference images taken by another camera 104 at a different time, either earlier or later, and using angular offsets with non-zero Δϕ.

Figure 13:
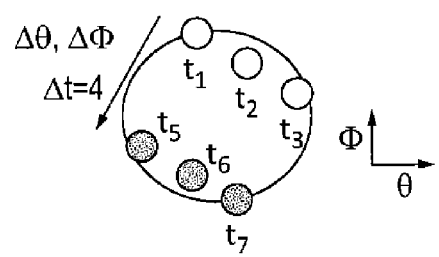
FIG. 13 is an illustration of a multi-dimensional solution to correlate the images of the turbule when the turbule is imaged by different cameras at different times.

Referring now to FIG. 13, a correlation peak in r(Δt, Δθ, Δϕ) occurs when Δt=4 frames, Δθ~0.4α, and Δϕ~0.6 α, where α is the angular width of the sun 124. Correlating over a three-dimensional range of offsets Δt, Δθ, and Δϕ is computationally more expensive than correlating over the one-dimensional range, Δθ. In one embodiment, the computer 108 first attempts to correlate over the one-dimensional range, Δθ, and then attempts to correlate over the three dimensional range of offsets Δt, Δθ, and Δϕ if computational bandwidth is available. In another embodiment, the computer 108 is optimized to correlate over the three dimensional range of offsets Δt, Δθ, and Δϕ.

Multiple Camera Configurations

In various embodiments, the turbulence and winds aloft measurement system 100 may comprise one, two, or multiple cameras 104. The ability for the turbulence and winds aloft measurement system 100 to accurately resolve the altitude of turbules 112, 302, 602, 604, and 1002 may depend in part upon the distance between the cameras 104. For example, cameras 104 that are close together generally see the same turbules 112, 302, 602, 604, and 1002, making computations easier, but cameras 104 that are further apart may resolve angular distances to a finer granularity. Also turbules 112, 302, 602, 604, and 1002 at lower altitudes will have greater angular displacements frame-to-frame for a given linear velocity because they are closer to the cameras 104, making computations possible even for relatively closely placed cameras 104, that is, cameras 104 that may be separated by a relatively small d. Turbules 112, 302, 602, 604, and 1002 that are higher in the atmosphere will have relatively lower angular displacement frame-to-frame, and thus will require greater distances between cameras 104 in order to resolve accurately.

In an embodiment, a first pair of cameras 104 are separate by a distance of approximately 10 meters, while a third camera 104 is separated from the pair of cameras 104 by approximately 100 meters. The first pair of cameras 104 provide good characterization of turbules 112, 302, 602, 604, and 1002 at lower altitudes, while the third camera 104 facilitates characterizing turbules 112, 302, 602, 604, and 1002 at high altitudes.

In an embodiment, the cameras 104 are mounted on an ocean-going vehicle 102, for example a ship or vessel. For example, the first pair of cameras 104 might be mounted near the bow of a vessel on either side of the deck, while the third camera might be mounted further back on the vessel closer to the stern.

In an embodiment, the cameras 104 are located roughly at the corners of an equilateral triangle on the surface of the earth 110. This configuration ensures that turbules 112, 302, 602, 604, and 1002 traveling in any direction within a selected altitude range will be simultaneously visible to at least two of the cameras 104 during part of the turbules 112, 302, 602, 604, and 1002 transit across the sun 124. This configuration also allows using one-dimensional angular offsets for correlation between each pair of cameras 104, which is computationally less costly than the three-dimensional offsets needed to achieve similar coverage with, for example, two cameras 104a, 104b.

Single Camera Configuration

A central problem encountered by the system 100 is that turbulence is characterized by two unknowns: height and velocity. Slow-moving turbulence at low altitude has the same apparent angular velocity as fast-moving turbulence at high altitude, so a single set of observations cannot resolve the actual height and velocity of a turbule 112. In previously described embodiments, a solution is to take measurements at two or more spaced-apart locations, such as by triangulating measurements from two cameras 104a, 104b (FIG. 1) spaced a modest distance apart.

As previously described, an embodiment may use cameras 104a, 104b mounted on a moving (or unsteady) platform 102.

When the moving platform 102 has non-uniform velocity, such as the motion of a ship or a buoy affected by waves at sea, in an embodiment, the system 100 may use measurements from a single camera 104 (i.e., camera 104a alone or camera 104b alone) moving with two or more velocity vectors.

If the camera 104 moves with the same velocity vector as the turbule 112, then the apparent angular velocity of the turbule is zero. If the camera 104 moves at the same speed as the turbule 112, but in the opposite direction, then the apparent angular velocity of the turbule is twice as great as if the camera were stationary. Given two such measurements, namely, one in which the turbule 112 has zero angular velocity and one in which the camera 104 moves at the same speed but in the opposite direction, speed of the turbule can be determined.

Figure 14:
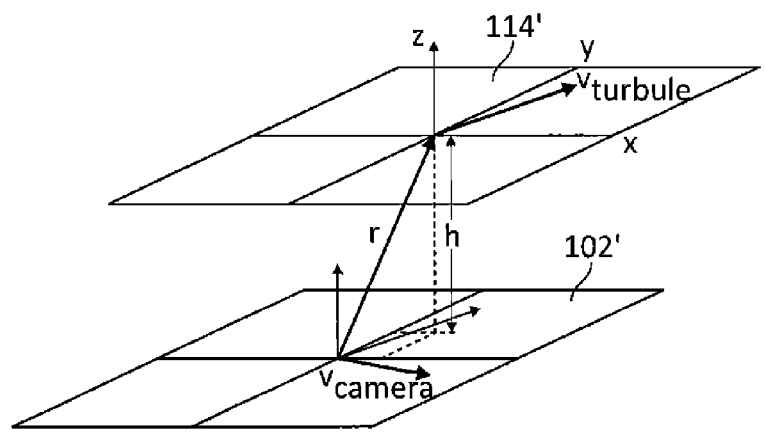
FIG. 14 is a diagram showing relationships between velocity vectors of a camera used in an embodiment and a turbule.

Mathematically, calculating the speed of the turbule 112 can be generalized to cases where the measured angular velocities do not happen to include zero. As shown in FIG. 14, at a low altitude, the camera 104 (FIG. 1) moves with velocity $v_{camera}$ relative to the Earth's surface 112 (represented by the lower grid 110'). At a higher altitude (represented by the upper grid 114'), turbules 112 move with a different velocity $v_{turbule}$. The altitude difference between the camera 104 and the turbules 112 is h. The line of sight from the camera to a turbule passing in front of the sun or moon is vector r.

In this embodiment, the camera 104 measures apparent motion of the turbules 112 over a brief interval, during which the camera velocity $v_{camera}$ is roughly constant. (This uniform velocity may be assumed because the interval is brief, or the processor 108 may use measurements of velocity or acceleration to select an interval during which the velocity is roughly constant.) The measured angular velocity of the turbules is given by:

$$\omega = \tilde{r} \times (v_{turbule} - v_{camera})/r. \quad \text{Equation (15)}$$

That is, the angular velocity is the cross product of $\tilde{r}$ (the unit vector in the r direction) and the turbules' velocity relative to the camera 104, divided by the distance r from the camera to the turbules 112.

After one such measurement, three values are known: $\omega$ (angular velocity of the turbules), $\tilde{r}$ (the direction from the camera 104 to the turbules 112), and camera velocity $v_{camera}$. Velocity $v_{turbule}$ and distance r remain unknown. To compute their values, the invention takes two angular velocity measurements, $\omega_1$ and $\omega_2$. Each measurement comprises at least two image frames, using the method previously described. The two measurements occur while the camera is moving at two substantially different velocity vectors, $v_{cam1}$ and $v_{cam2}$. The measurements are close enough in time that r and $v_{turbule}$ can be assumed to change very little, namely, the first measurement may occur as a ship-mounted camera 104 rolls to the right and the second measurement may occur at a subsequent time (i.e., after a time interval) as the same camera rolls to the left. The angular velocity measurements are related to the camera velocities as shown here:

$$\omega_1 = \tilde{r} \times (v_{turbule} - v_{cam1})/r \quad \text{Equation (16)}$$

$$\omega_2 = \tilde{r} \times (v_{turbule} - v_{cam2})/r. \quad \text{Equation (16)}$$

Equation (16) and Equation (17) are each multiplied by r and rearranged using the distributive property of cross products over addition:

$$\omega_1 r = \tilde{r} \times v_{turbule} - \tilde{r} \times v_{cam1} \quad \text{Equation (18)}$$

$$\omega_2 r = \tilde{r} \times v_{turbule} - \tilde{r} \times v_{cam2} \quad \text{Equation (19)}$$

Equation (19) is subtracted from Equation (18) to give:

$$(\omega_1 - \omega_2) r = \tilde{r} \times (v_{cam2} - v_{cam1}) \quad \text{Equation (20)}$$

The result is rearranged to solve for the distance r:

$$r = \tilde{r} \times (v_{cam2} - v_{cam1}) \cdot (\omega_1 - \omega_2) / |(\omega_1 - \omega_2)|^2 \quad \text{Equation (21)}$$

where "·" indicates a dot product and $|(\omega_1 - \omega_2)|$ is the magnitude of vector $(\omega_1 - \omega_2)$.

A less rigorous, but computationally more expedient, embodiment may use the following formula instead:

$$r = \tilde{r} \times (v_{cam2} - v_{cam1}) / |(\omega_1 - \omega_2)| \quad \text{Equation (22)}$$

Given the value of r and the direction of $\tilde{r}$, this embodiment may use well-known trigonometry to compute height h, e.g., $h = r \tilde{r} \cdot k$, where k is the unit vector in the z direction.

To compute $v_{turbule}$, Equation (16) is rearranged:

$$r\omega_1 = \tilde{r} \times v_{turbule} - \tilde{r} \times v_{cam1} \quad \text{Equation (23)}$$

and the term containing $v_{turbule}$ is isolated:

$$\tilde{r} \times v_{turbule} = \tilde{r} \times v_{cam1} - r\omega_1. \quad \text{Equation (24)}$$

The cross product on the left is expanded to identify its vector components:

$$\tilde{r} \times v_{turbule} = i(\tilde{r}_y v_z - \tilde{r}_z v_y) + j(\tilde{r}_z v_x - \tilde{r}_x v_z) + k(\tilde{r}_x v_y - \tilde{r}_y v_x). \quad \text{Equation (25)}$$

where i, j, and k are unit vectors in the x, y, and z directions. It is assumed that, on average, a group of turbules 112 moves horizontally with the wind at altitude h, even though individual turbules may move up or down within a body of air. Given this assumption, the vertical component of $v_{turbule}$, $v_z$, goes to zero, as do all terms containing it in Equation (25):

$$\tilde{r} \times v_{turbule} = i(-\tilde{r}_z v_y) + j(\tilde{r}_z v_x) + k(\tilde{r}_x v_y - \tilde{r}_y v_x). \quad \text{Equation (26)}$$

Recalling Equation (24), each component of Equation (26) must match the corresponding component of the right side of Equation (24). In particular, the i-components Equation (27)) and the j-components Equation (28)):

$$-\tilde{r}_z v_y = i \cdot (\tilde{r} \times v_{cam1} - r\omega_1) \quad \text{Equation (27)}$$

$$\tilde{r}_z v_x = j \cdot (\tilde{r} \times v_{cam1} - r\omega_1). \quad \text{Equation (28)}$$

Since the processor 108 already has measured or calculated every value in Equation (27) except $v_x$ and every value in Equation (28) except $v_y$, Those two values now can be calculated. They jointly determine $v_{turbule}$:

$$v_{turbule} = i v_x + j v_y. \quad \text{Equation (29)}$$

With the single-camera embodiment, the processor 116 through communications system 116 may report h, $v_x$, and $v_y$, namely, altitude, speed, and direction of winds aloft. This embodiment also may use previously described methods to estimate and report the magnitude of turbulence at each altitude, but now does so with a single camera.

Communications

In an embodiment, the turbulence and winds aloft measurement system 100 further comprises a communications link 116 to transfer estimates of turbulence, turbules 112, and winds 114 aloft. In embodiments, the communications link 116 may receive and transmit estimates. In embodiments, the communications links 116 may permit transfers of estimates with aircraft 118, a weather service provider 130, a national weather agency, an airline operations center, a military aircraft command center, and/or a solar or lunar information service for obtaining up-to-date images of the sun 124 and moon 122.

In an embodiment, the turbulence and winds aloft measurement system 100 may communicate information to the pilot, navigator or other operator of the vehicle 102. In an embodiment, the turbulence and winds aloft measurement system 100 may send the estimates to a weather forecasting center or weather service provider 130. In an embodiment, the turbulence and winds aloft measurement system 100 may share the information with nearby aircraft 118 or systems on the ground. In an embodiment, the turbulence and winds aloft measurement system 100 may share raw or interpreted data with nearby vehicle 102 to develop a better indication of local turbulence, turbules 112, and winds aloft 114. In an embodiment, the data may be is shared via military communications links, for example Link-16.

The embodiments of the invention shown in the drawings and described above are exemplary of numerous embodiments that may be made within the scope of the appended claims. It is contemplated that numerous other configurations of the turbulence and winds aloft measurement system 100 may be created taking advantage of the disclosed approach. It is the applicant's intention that the scope of the patent issuing herefrom will be limited only by the scope of the appended claims.

What is claimed is:

1. A turbulence and winds aloft detection system, comprising:
   an image capturing device for capturing a plurality of images of a visual feature of a selected celestial object; and
   an image processor configured to
      compare the plurality of images of the visual feature to detect a transit of a turbule of turbulent air between the image capturing device and the selected celestial object;
      compensate for one or more of apparent visual motion of celestial objects due to a planet's translation and rotation, the moon's revolution about the planet, and the atmosphere's refractive displacement of celestial objects; and
      compute a measurement of at least one of a velocity of the turbule and a height of the turbule relative to the planet.

2. The turbulence and winds aloft detection system of claim 1, further comprising a lens having a focal length adapted to focus an image onto said image capturing device such that a combination of said lens and said image capturing device is adapted to resolve a distortion of said visual feature caused by turbulent air.

3. The turbulence and winds aloft detection system of claim 1, wherein the image capturing device is a charge coupled device (CCD) camera.

4. The turbulence and winds aloft detection system of claim 1, wherein the celestial object is selected from the group consisting of the moon, the sun, a plurality of stars, and a planet; and wherein the visual feature is selected from the group consisting of an edge of a solar disc, a sunspot, a solar granule, an edge of a lunar disc, a lunar crater, a lunar mountain range, a lunar shadow, a relative position of each of the plurality of stars, and a position of moons about the planet.

5. The turbulence and winds aloft detection system of claim 1, further comprising a filter disposed between the image capturing device and the celestial object, wherein the filter is selected from the group consisting of a helium I filter, a hydrogen alpha filter, a solar filter, a neutral density filter, a polarizing filter, an narrowband filter, a wideband filter, and an optically colored filter.

6. The turbulence and winds aloft detection system of claim 1, wherein the image capturing device is mounted on a mobile platform and the image processor is adapted to estimate a velocity of the image capturing device relative to the planet; and to use the velocity of the image capturing device to correct an estimate of one or more of the velocity of the turbule relative to the planet and a height of the turbule above the planet.

7. The turbulence and winds aloft detection system of claim 6 wherein the mobile platform is selected from the group consisting of a marine vessel, a land vehicle, an aircraft, and a spacecraft.

8. The turbulence and winds aloft detection system of claim 6, further comprising at least one of a global positioning satellite (GPS) receiver and one or more accelerometers to provide the image processor with data on the velocity of the image capturing device.

9. A turbulence and winds aloft detection system, comprising:
   an image capturing device for capturing a plurality of images of a visual feature of a selected celestial object;
   a device for sensing motion of the image capturing device relative to the Earth; and
   an image processor configured to
      compare the plurality of images of the visual feature to detect a transit of a turbule of turbulent air between the image capturing device and the selected celestial object;
      receive a signal from the motion sensing device to continuously estimate a velocity of the image capturing device relative to the Earth; and
      compute a measurement of at least one of a velocity of the turbule relative to the Earth and a height of the turbule relative to the Earth.

10. The turbulence and winds aloft detection system of claim 9 wherein the motion sensing device includes at least one of a global positioning satellite (GPS) receiver and at least one accelerometer, the at least one accelerometer being associated with the image capturing device for sensing motion of the image capturing device.

11. The turbulence and winds aloft detection system of claim 9 wherein the height of the turbule relative to the Earth is computed by comparing a first measured angular velocity of the turbule relative to the image capturing device moving at a first velocity at a first measurement time with a second angular velocity of the turbule relative to the image capturing device moving at a second velocity at a subsequent second measurement time.

12. The turbulence and winds aloft detection system of claim 9 wherein the velocity of the turbule relative to the Earth is computed at a predetermined height of the turbule by comparing a measured angular velocity of the turbule relative to a velocity of the image capturing device.

13. A method of detecting turbulence and winds aloft, comprising:
   capturing a plurality of images of a visual feature of a selected celestial object;
   comparing the plurality of images to detect the transit of a turbule of turbulent air in front of the selected celestial object; and
   processing the plurality of images to compensate for one or more of apparent visual motion of celestial objects due to a planet's translation and rotation, the moon's revolution about the planet, and the atmosphere's refractive displacement of celestial objects; and
   computing a measurement of at least one of an angular velocity of the turbule and the height of the turbule.

14. The method of claim 13, wherein the capturing step includes capturing a plurality of images of a visual feature of a selected celestial object selected from the group consisting of the moon, the sun, a grouping of stars, and a planet; and wherein the visual feature is selected from the group consisting of an edge of a solar disc, a sunspot, a solar granule, an edge of a lunar disc, a lunar crater, a lunar shadow, a relative position of each of the grouping of stars, and a position of moons about the planet.

15. The method of claim 13, wherein the capturing is performed by an image capturing device mounted on a mobile platform and the processing includes continuously estimating a velocity of the image capturing device relative to the planet; and using the velocity of the image capturing device to correct an estimate of one or more of the velocity of the turbule relative to the planet and a height of the turbule above the planet.

16. The method of claim 15, wherein the mobile platform is selected from the group consisting of a marine vessel, a land vehicle, an aircraft, and a spacecraft.

17. The method of claim 15, wherein the processing includes receiving data from at least one of a global positioning satellite (GPS) receiver and one or more accelerometers on the velocity of the image capturing device.

18. A method of detecting turbulence and winds aloft, comprising:
    capturing a plurality of images of a visual feature of a selected celestial object with an image capturing device;
    sensing motion of the image capturing device relative to the Earth;
    processing the plurality of images of the visual feature to detect a transit of a turbule of turbulent air between the image capturing device and the selected celestial object;
    using sensed motion of the image capturing device to continuously estimate a velocity of the image capturing device relative to the Earth; and
    computing a measurement of at least one of a velocity of the turbule relative to the Earth and a height of the turbule relative to the Earth.

19. The method of claim 18 wherein the height of the turbule relative to the Earth is computed by comparing a first measured angular velocity of the turbule relative to the image capturing device moving at a first velocity at a first measurement time with a second angular velocity of the turbule relative to the image capturing device moving at a second velocity at a subsequent second measurement time.

20. The method of claim 18 wherein the velocity of the turbule relative to the Earth at a predetermined height of the turbule is computed by comparing a measured angular velocity of the turbule relative to the image capturing device.

21. The method of claim 18 wherein the velocity measurement is corrected for the velocity of the image capturing device.

* * * * *